US008219265B2

(12) United States Patent
Dwyer et al.

(10) Patent No.: US 8,219,265 B2
(45) Date of Patent: Jul. 10, 2012

(54) PERSPECTIVE VERTICAL SITUATION DISPLAY SYSTEM AND METHOD

(75) Inventors: David B. Dwyer, Scottsdale, AZ (US); Troy A. Nichols, Phoenix, AZ (US); Mathew Hilbert, Glendale, AZ (US); Michael C. Little, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 199 days.

(21) Appl. No.: 12/547,091

(22) Filed: Aug. 25, 2009

(65) Prior Publication Data

US 2009/0312893 A1 Dec. 17, 2009

Related U.S. Application Data

(62) Division of application No. 10/856,891, filed on May 27, 2004, now Pat. No. 7,603,209.

(60) Provisional application No. 60/525,408, filed on Nov. 25, 2003.

(51) Int. Cl.
*G05D 1/08* (2006.01)
*G05D 1/10* (2006.01)
*G01C 21/00* (2006.01)

(52) U.S. Cl. ............ 701/4; 340/967; 340/971; 340/979; 348/117

(58) Field of Classification Search ................ 701/3, 14, 701/18, 4, 8, 15, 16; 340/973, 971, 976, 340/964, 945, 979; 348/116, 117; 345/419
See application file for complete search history.

(56) References Cited

U.S. PATENT DOCUMENTS

| 3,331,069 A | 7/1967 | Cornell et al. |
| 3,539,696 A | 11/1970 | Sweeney et al. |
| 3,643,258 A | 2/1972 | Balding |
| 5,355,442 A | 10/1994 | Paglieroni et al. |
| 5,920,321 A | 7/1999 | Owen et al. |
| 5,936,552 A | 8/1999 | Wichgers et al. |
| 6,389,355 B1 | 5/2002 | Gibbs et al. |
| 6,690,299 B1 * | 2/2004 | Suiter ............................ 340/973 |
| 6,842,122 B1 | 1/2005 | Langner et al. |
| 6,985,801 B1 | 1/2006 | Straub et al. |
| 7,010,398 B2 | 3/2006 | Wilkins, Jr. et al. |
| 2003/0023354 A1 * | 1/2003 | Brust et al. ........................ 701/3 |
| 2003/0193410 A1 * | 10/2003 | Chen et al. .................... 340/971 |

FOREIGN PATENT DOCUMENTS

WO 0120583 A2 3/2001

OTHER PUBLICATIONS

PCT International Search Report, PCT/US2004/016953.

\* cited by examiner

*Primary Examiner* — Thomas G. Black
*Assistant Examiner* — Christine Behncke
(74) *Attorney, Agent, or Firm* — Ingrassia Fisher & Lorenz, P.C.

(57) ABSTRACT

A display system and method for an aircraft simultaneously displays the terrain under the flight plan, or under the current track of the aircraft, as both a two-dimensional lateral situation view image and as a perspective vertical situation view image. This provides improved tactical flight planning, and that does not erroneously show the flight plan passing through the displayed terrain.

6 Claims, 14 Drawing Sheets

PERSPECTIVE VERTICAL SITUATION DISPLAY SYSTEM AND METHOD

CROSS-REFERENCE TO RELATED APPLICATIONS

This application claims the benefit of U.S. Provisional Application No. 60/525,408, filed Nov. 25, 2003, and is a divisional application of U.S. patent application Ser. No. 10/856,891, now U.S. Pat. No. 7,603,209.

TECHNICAL FIELD

The present invention relates to a display for a vehicle and, more particularly, to a system and method for displaying a perspective view of terrain information in an aircraft vertical situation display.

BACKGROUND

Modern map displays, particularly those used in aircraft for flight planning and monitoring, are capable of displaying a considerable amount of information such as weather information and terrain information. The weather information consists of airborne weather information from onboard weather radar or weather information received from, for example, ground based or satellite weather sources.

Most modern displays additionally allow an aircraft flight plan to be displayed from two different views, either a lateral view or a vertical view, which can be displayed individually or simultaneously on the same display. The lateral view, generally known as a lateral map display, is basically a top-view of the aircraft flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate where the aircraft may potentially impact terrain.

The vertical view, generally known as a vertical situation display, provides a two-dimensional view of the aircraft flight plan. The vertical situation display may include one or more of the above-mentioned features that are displayed on the lateral map, including the terrain information. With some displays, if the terrain information is displayed in the vertical situation display, it may be displayed below the flight plan and/or in front of the aircraft. Although the present method of displaying terrain data in the vertical situation display is effective, it does suffer certain drawbacks. For example, the two-dimensional display of terrain may not provide sufficient information for tactical, short-term flight planning and/or maneuvering. Moreover, the swath of the flight plan can be either left or right of course, depending on navigational system accuracy. As such, the vertical situation display can erroneously indicate that the flight plan extends through the displayed terrain, if relatively high terrain is positioned to the left or right of the flight plan.

Hence, there is a need for a display system and method that addresses one or more of the above-noted drawbacks. Namely, a display system and method that displays the terrain under the flight plan or under the current track of the aircraft that provides improved tactical flight planning, and/or that does not erroneously show the flight plan passing through the displayed terrain. The present invention addresses one or more of these needs.

BRIEF SUMMARY

The present invention provides a display system and method in which the terrain under the flight plan, or under the current track of the aircraft, is displayed in a manner that provides improved tactical flight planning, and/or that does not erroneously show the flight plan passing through the displayed terrain. In one embodiment, and by way of example only, a flight deck display system includes a processor and a display device. The processor is adapted to receive at least terrain data and is operable, in response thereto, to supply one or more image rendering display commands. The display device is coupled to receive the image rendering display commands and is operable, in response thereto, to simultaneously render a two-dimensional lateral situation view image representative of the terrain data and a perspective vertical situation view image representative of the terrain data.

In another exemplary embodiment, a method of displaying terrain on an aircraft flight deck display system includes the steps of processing terrain data, and simultaneously displaying a two-dimensional lateral situation view image representative of the terrain data and a perspective vertical situation view image representative of the terrain data.

BRIEF DESCRIPTION OF THE DRAWINGS

The present invention will hereinafter be described in conjunction with the appended drawing figures, wherein like numerals denote like elements, and in which.

DETAILED DESCRIPTION

Figure 1:
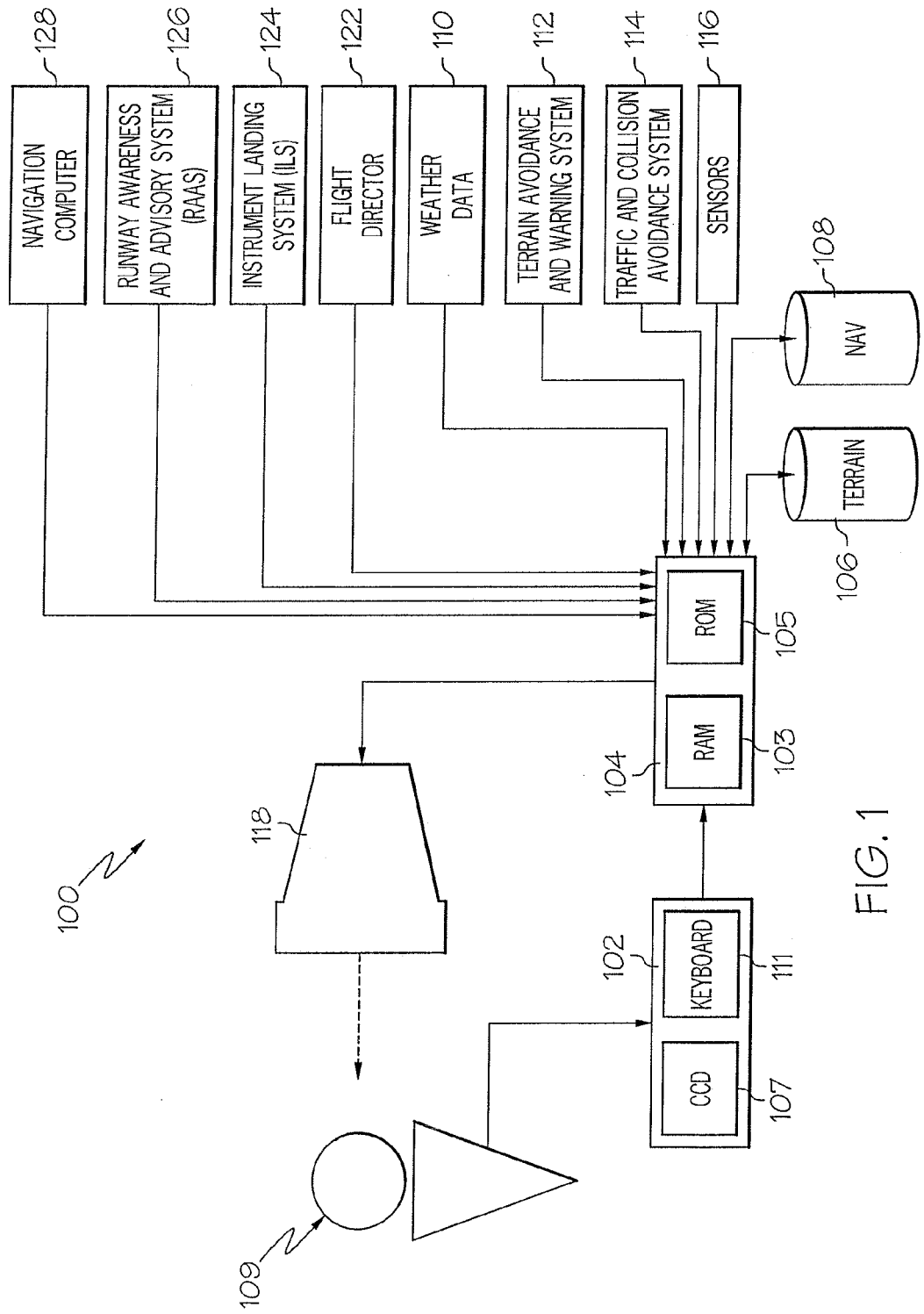
FIG. 1 is a functional block diagram of a flight deck display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to the description, and with reference to FIG. 1, an exemplary flight deck display system will be described. The system 100 includes a user interface 102, a processor 104, one or more terrain databases 106, one or more navigation databases 108, a source of weather data 110, a terrain avoidance and warning system (TAWS) 112, a traffic and collision avoidance system (TCAS) 114, various sensors 116, and a display device 118. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 is in operable communication with the terrain databases 106, the navigation databases 108, and the display device 118, and is coupled to receive various types of inertial data from the various sensors 116, and various other avionics-related data from one or more other external systems, which are briefly described further below. The processor 104 is configured, in response to the inertial data, to selectively retrieve terrain data from one or more of the terrain databases 106 and navigation data from one or more of the navigation databases 108, and to supply appropriate display commands to the display device 118, so that the retrieved terrain and navigation data are appropriately displayed on the display device 118. As FIG. 1 additionally shows, the processor 104 is also in operable communication with the source of weather data 110, the TAWS 112, the TCAS 114, and is additionally configured to supply appropriate display commands to the display device 118 so that the avionics data, weather data 110, data from the TAWS 112, data from the TCAS 114, and data from the previously mentioned external systems may also be selectively displayed on the display device 118. The preferred manner in which the terrain and navigation data are displayed on the display will be described in more detail further below. Before doing so, however, a brief description of the processor 104, the data sources 106-114, and the display device 118, at least in the depicted embodiment, will be provided.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the on-board RAM 103, or integrally formed as part of the processor 104, and/or RAM 103, and/or ROM 105. The terrain databases 106 and navigation databases 108 could also be part of a device or system that is physically separate from the display system 100.

The avionics data that is supplied from the sensors 116 includes data representative of the state of the aircraft such as, for example, aircraft speed, altitude, and heading. The weather data 108 supplied to the processor 104 is representative of at least the location and type of various weather cells. The data supplied from the TCAS 114 includes data representative of other aircraft in the vicinity, which may include, for example, speed, direction, altitude, and altitude trend. In a preferred embodiment, the processor 104, in response to the TCAS data, supplies appropriate display commands to the display device 118 such that a graphic representation of each aircraft in the vicinity is displayed on the display device 118. The TAWS 112 supplies data representative of the location of terrain that may be a threat to the aircraft. The processor 104, in response to the TAWS data, preferably supplies appropriate display commands to the display device 118 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to the processor 104 for display on the display device 118. In the depicted embodiment, these external systems include a flight director 122, an instrument landing system (ILS) 124, a runway awareness and advisory system (RAAS) 126, and a navigation computer 128. The flight director 122, as is generally known, supplies command data representative of commands for piloting the aircraft in response to flight crew entered data, or various inertial and avionics data received from external systems. The command data supplied by the flight director 122 may be supplied to the processor 104 and displayed on the display device 118 for use by the pilot 109, or the data may be supplied to an autopilot (not illustrated). The autopilot, in turn, produces appropriate control signals which are applied to the aircraft's flight control surfaces to cause the aircraft to fly in accordance with the flight crew entered data, or the inertial and avionics data.

The ILS 124 is a radio navigation system that provides aircraft with horizontal and vertical guidance just before and during landing and, at certain fixed points, indicates the distance to the reference point of landing. The system includes ground-based transmitters (not illustrated) that transmit radio frequency signals. The ILS 124 on board the aircraft receives these signals and supplies appropriate data to the processor for display of, for example, an ILS feather (not illustrated in FIG. 1) on the display device 118. The ILS feather represents two signals, a localizer signal that is used to provide lateral guidance, and a glide slope signal that is used for vertical guidance.

The RAAS 126 provides improved situational awareness to help lower the probability of runway incursions by providing timely aural advisories to the flight crew during taxi, takeoff, final approach, landing and rollout. The RAAS 126 uses GPS data to determine aircraft position and compares aircraft position to airport location data stored in the navigation database 108. Based on these comparisons, the RAAS 126, if necessary, issues appropriate aural advisories. The aural advisories the RAAS 126 may issue inform the pilot 109, among other things of when the aircraft is approaching a runway—either on the ground or from the air, when the aircraft has entered and is aligned with a runway, when the runway is not long enough for the particular aircraft, the distance remaining to the end of the runway as the aircraft is landing or during a rejected takeoff, when the pilot 109 inadvertently begins to take off from a taxiway, and when an aircraft has been immobile on a runway for an extended time.

The navigation computer 128 is used, among other things, to allow the pilot 109 to program a flight plan from one destination to another. The navigation computer 128 may be in operable communication with the flight director 122. As was mentioned above, the flight director 122 may be used to automatically fly, or assist the pilot 109 in flying, the programmed route. The navigation computer 128 is in operable communication with various databases including, for example, the terrain database 106, and the navigation database 108. The processor 104 may receive the programmed flight plan data from the navigation computer 128 and cause programmed flight plan, or at least portions thereof, to be displayed on the display device 118.

The display device 118 is used to display various images and data, in both a graphical and a textual format, and to supply visual feedback to the user 109 in response to the user input commands supplied by the user 109 to the user interface 102. It will be appreciated that the display device 118 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, display element 104 includes a panel display. To provide a more complete description of the method that is implemented by the flight management system 100, a general description of the display device 118 and its layout will now be provided.

Figure 2:
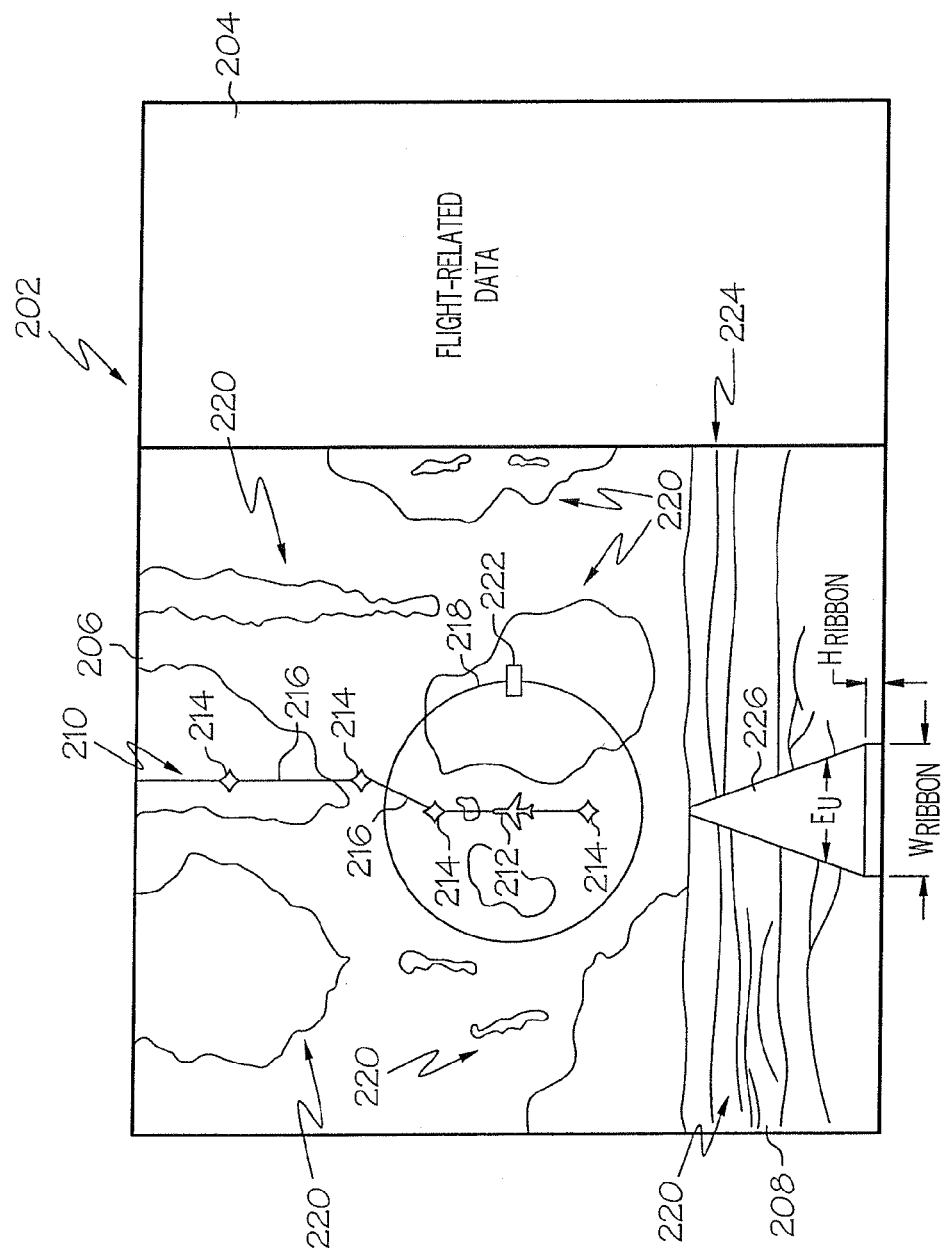
FIG. 2 is a simplified representation of an exemplary display screen that may be used in the system of FIG. 1, which shows the overall layout of the display screen, and on which is various graphical and textual images are simultaneously displayed.

With reference to FIG. 2, it seen that the display device 118 includes a display area 202 in which multiple graphical and textual images may be simultaneously displayed, preferably in different sections of the display area 202. For example, general flight-related data 204, a lateral situation display 206, and a vertical situation display 208 may be displayed simultaneously, alone, or in various combinations, in various sections of the display area 202. The general flight-related data 204 that is displayed may include various types of data related to the flight plan of the aircraft. Such data includes, but is not limited to, the flight identifier, route iteration number, a waypoint list and associated information, such as bearing and time to arrive, just to name a few. It will be appreciated that the general flight-related data 204 may additionally include various types of data associated with various types of flight hazards. Examples of these, and other types of data that may be displayed, are disclosed in U.S. Pat. No. 6,289,277, entitled "Interfaces for Planning Vehicle Routes," which is assigned to the assignee of the present application, and the entirety of which is hereby incorporated by reference.

The lateral situation display 206 includes a top-view aircraft symbol 212, and flight plan 210 represented by one or more waypoint symbols 214 and interconnecting line segments 216, and one or more range rings 218. The lateral situation display 206 also preferably includes various map features including, but not limited to, a lateral two-dimensional view of terrain 220 below the flight plan, political boundaries, and navigation aids. It will be appreciated that for clarity only the terrain 220 map feature is shown in FIG. 2. The range rings 218, only one of which is shown in FIG. 2, indicate nautical distance from the top-view aircraft symbol 212. In the illustrated embodiment, the range ring 218 includes a range indicator 222, which displays the lateral distance from the aircraft's present position to the position on the lateral map 202 that corresponds to the range ring 218 (e.g., 200 nautical miles). It will be appreciated that the value of the range indicator 222 may be set manually or automatically, via a non-illustrated a pop-up menu.

The vertical situation display 208 also provides a view of the terrain 220. The vertical situation display 208 may provide the view of the terrain 220 below the flight plan and/or ahead of the aircraft, and may show the terrain 220 and various other symbols and/or data (discussed further below) as either a two-dimensional profile vertical situation view or a perspective vertical situation view. In the depicted embodiment, the terrain 220 is displayed ahead of the aircraft and is shown as a perspective vertical situation view 224. It will be appreciated that the lateral situation display 206 and the vertical situation display 208 preferably use the same scale so that the pilot can easily orient the present aircraft position to either section of the display area 202. It will additionally be appreciated that the processor 104 may implement any one of numerous types of image rendering methods to process terrain data from the terrain database 106 and render the perspective vertical situation view 224. One such exemplary method is disclosed in U.S. patent application Ser. No. 10/282,709, entitled "Method for Producing 3D Perspective View Avionics Terrain Displays," which is assigned to the assignee of the present invention, and the entirety of which is hereby incorporated by reference.

It was noted above that the flight-related data 204, the lateral situation display 206, and the vertical situation display 208 may be displayed in various combinations. Hence, before proceeding further with the description, it should be appreciated that, for clarity and ease of explanation and depiction, in each of the figures referenced below only the lateral situation display 206 and the vertical situation display 208 are shown as being simultaneously displayed together in the display area 202 of the display device 118.

Returning now to the description, in addition to displaying the perspective vertical situation view 224 of the terrain 220, the vertical situation display 208 may also simultaneously display indicia representative of the current flight plan 210 of the aircraft. These indicia may be displayed in any one of numerous forms. For example, in the embodiment shown in FIG. 2, the flight plan 210 is displayed as a substantially transparent ribbon 226. The transparent ribbon 226 represents the lateral and vertical path of the flight plan 210 being flown (or to be flown). In a particular preferred embodiment, the width ($W_{ribbon}$) and height ($H_{ribbon}$) of the flight plan ribbon 226 are based on the lateral error uncertainty (EU) and the vertical accuracy of the aircraft, respectively. As is generally known, the lateral EU is the 95% probability of error in the lateral position of the aircraft. Thus, in such an embodiment, the width ($W_{ribbon}$) of flight plan ribbon 236 is equal to the EU (e.g., $W_{ribbon}$=EU).

Figure 3:
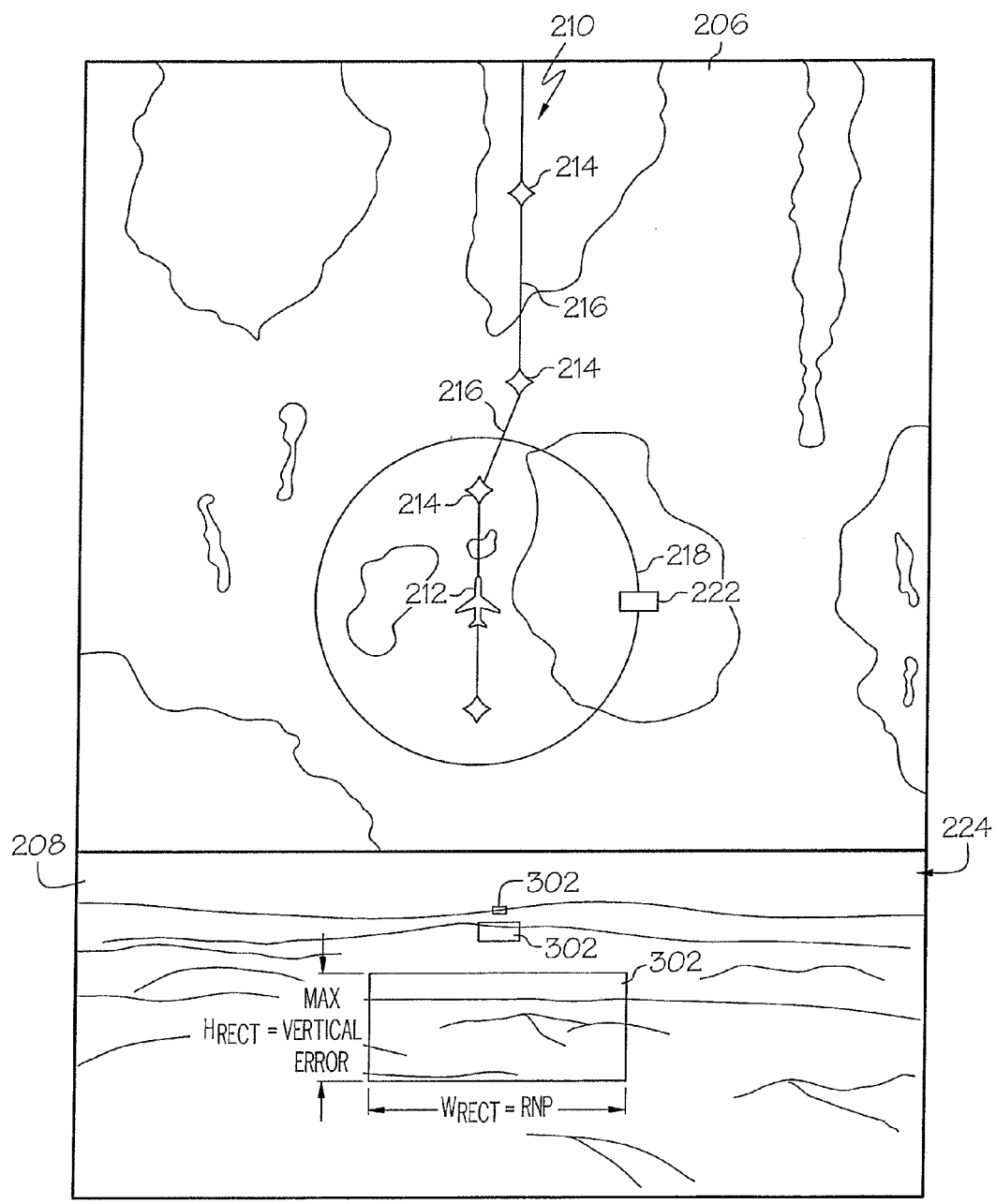
FIG. 3-14 are each exemplary display screens that depict a perspective view of terrain images and various other data in combination with a lateral two-dimension view of terrain images in accordance with an exemplary embodiment of the present invention.
Figure 4:
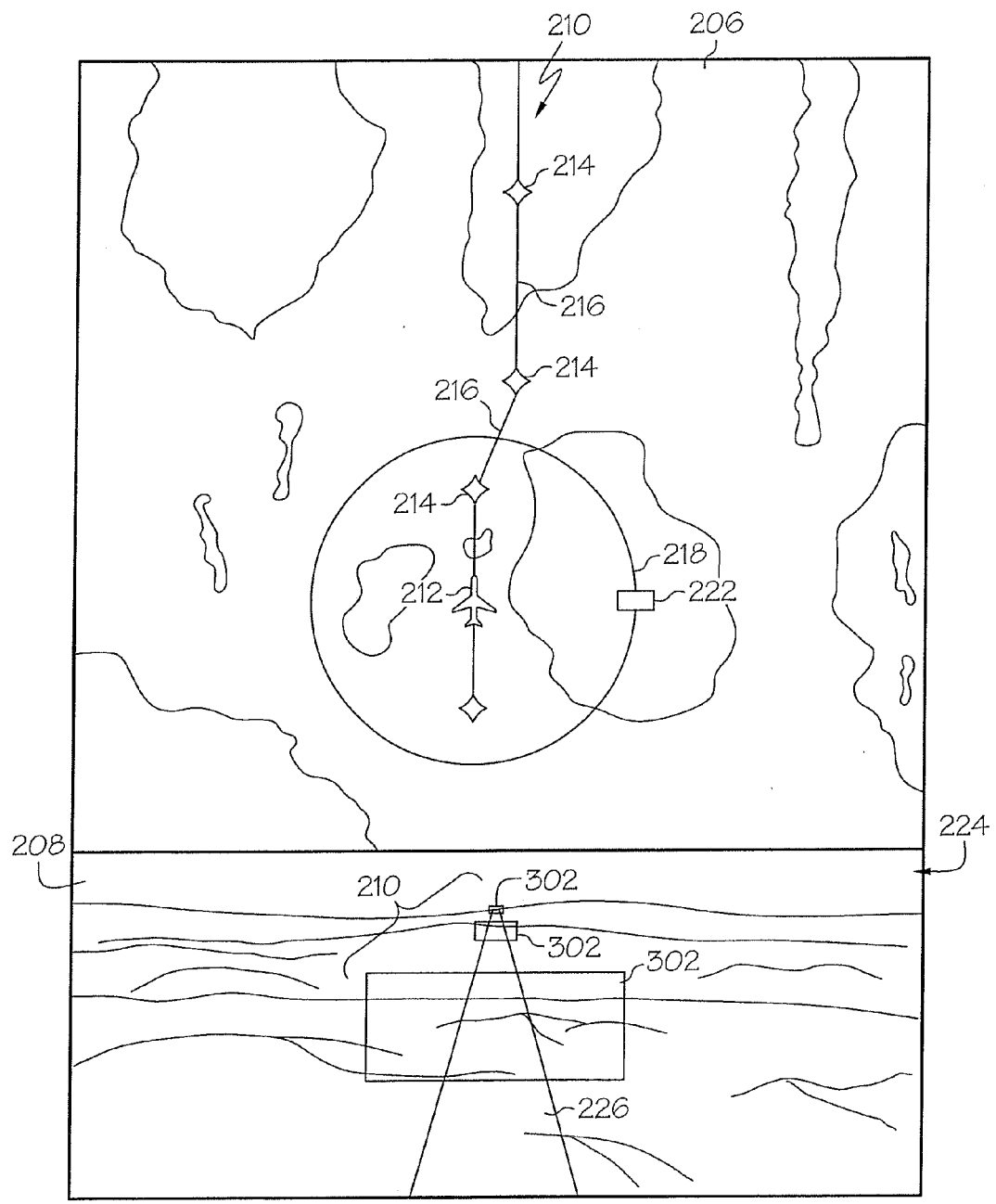

In addition to, or instead of, displaying the flight plan ribbon 226, the flight plan 210 may be displayed in the vertical situation display 208 as a so-called "highway in the sky." In such an embodiment, the flight plan 210 is displayed as a series of geometric shapes 302 such as, for example, boxes, squares, rectangles, or circles, through which the pilot is to fly the aircraft. An exemplary embodiment of the vertical situation display 208 depicting the highway in the sky as a series of rectangles 302 in the perspective vertical situation view 224 is shown in FIG. 3. In a particular preferred embodiment, the size of each rectangle 302 is based on the required navigational performance (RNP) and the maximum allowed vertical error for the airspace in which the aircraft is operating (e.g., "oceanic," "en route," "terminal," or "approach"). In particular, the width ($W_{rect}$) of each rectangle 302 is based on the RNP, and the height ($H_{rect}$) of each rectangle 302 is based on the maximum allowed vertical error. For example, when an aircraft is operating in a terminal airspace, which is a radar, air traffic controller (ATC) controlled airspace, the RNP is typically ±1 NM (nautical mile), and the maximum allowed vertical error is typically ±300 feet. Thus, each rectangle 302 in the flight plan 210 for this airspace would be 1 NM wide, and 300 feet high. As shown in FIG. 4, and as was just noted, the flight plan ribbon 226 could be displayed along with the series of rectangles 302. In such an embodiment, the flight plan ribbon 226 passes through the rectangles 302 that define the RNP and vertical accuracy of the aircraft.

It will be appreciated that the system 100 could be configured such that the flight plan ribbon 226 and the geometric shapes 302 may be selectively displayable, either alone or in combination with one another. It will additionally be appreciated that the system 100 could be configured such that the flight plan ribbon 236 may be selectively displayed based on the EU and vertical accuracy of the aircraft. Similarly, it will be appreciated that the system 100 could be configured such that the geometric shapes 302 may be selectively displayed based on the RNP and aircraft vertical accuracy.

Figure 5:
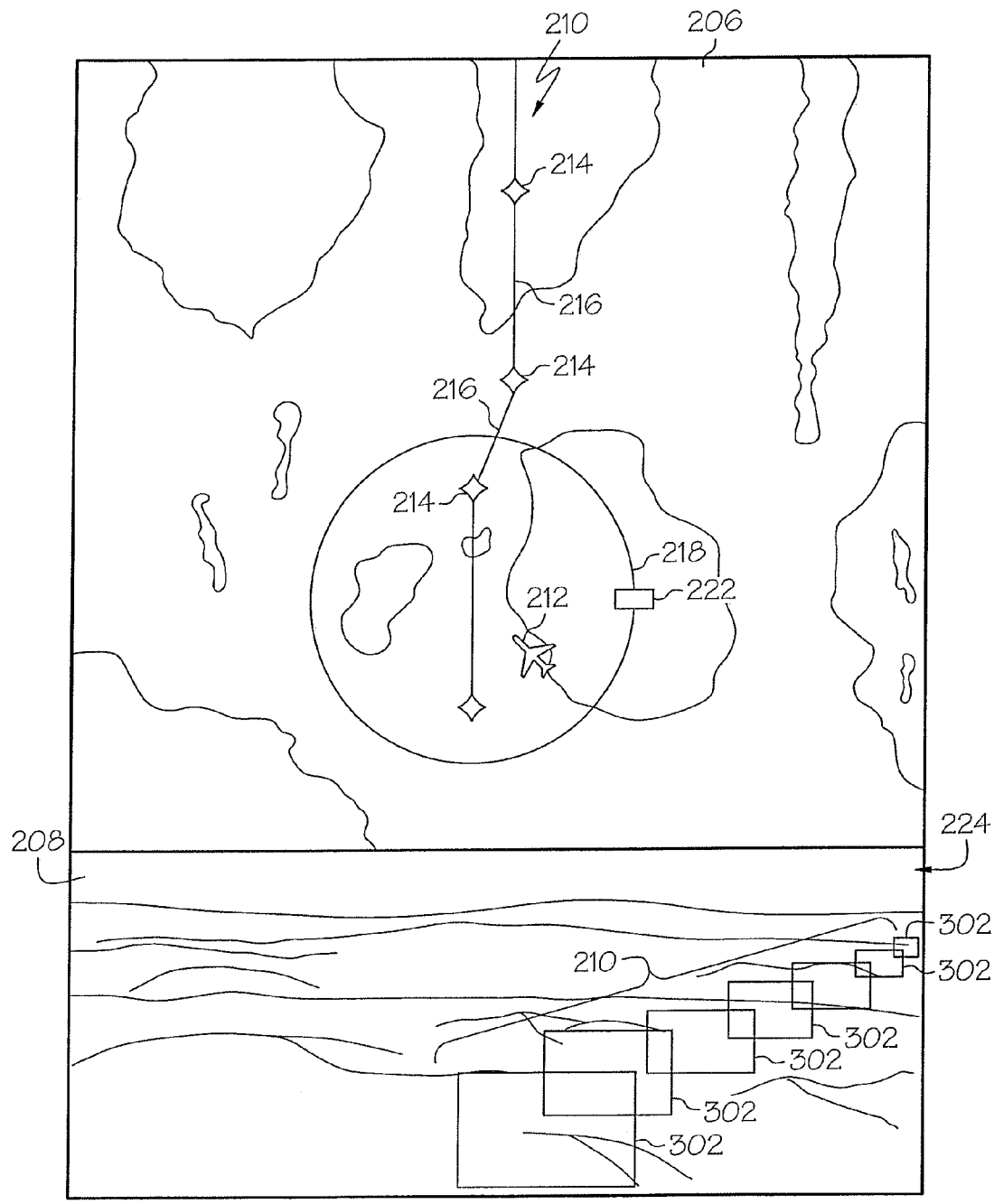

In addition to displaying the highway in the sky as a series of geometric shapes 302, the sizes of which may be selectively displayed based on the RNP and aircraft vertical accuracy, the system 100 can be configured to selectively change the number of geometric shapes 302 displayed in the vertical situation display 208. In a particular preferred embodiment, the system 100 is configured to change the number of geometric shapes 302 based on the flight phase of the aircraft, and/or the mode in which the aircraft flight director 1xx is operating. For example, when operating in a terminal airspace, it may be desirable to display numerous geometric shapes 302 so as to keep the pilot close to the desired flight plan 210. Conversely, when operating en route, the number of geometric shapes 320 can be fewer since the aircraft is typically operating at an altitude where terrain 220 is likely not a potential threat. In addition, as is shown more clearly in FIG. 5, the number of geometric shapes 302 displayed in the vertical situation display 208 may be increased when the aircraft is intercepting the flight plan 210, to help the pilot 109 perform the intercept. Once the flight path has been intercepted, and the aircraft is on the flight plan 210, both laterally and vertically, the number of geometric shapes 302 displayed may be reduced.

Figure 6:
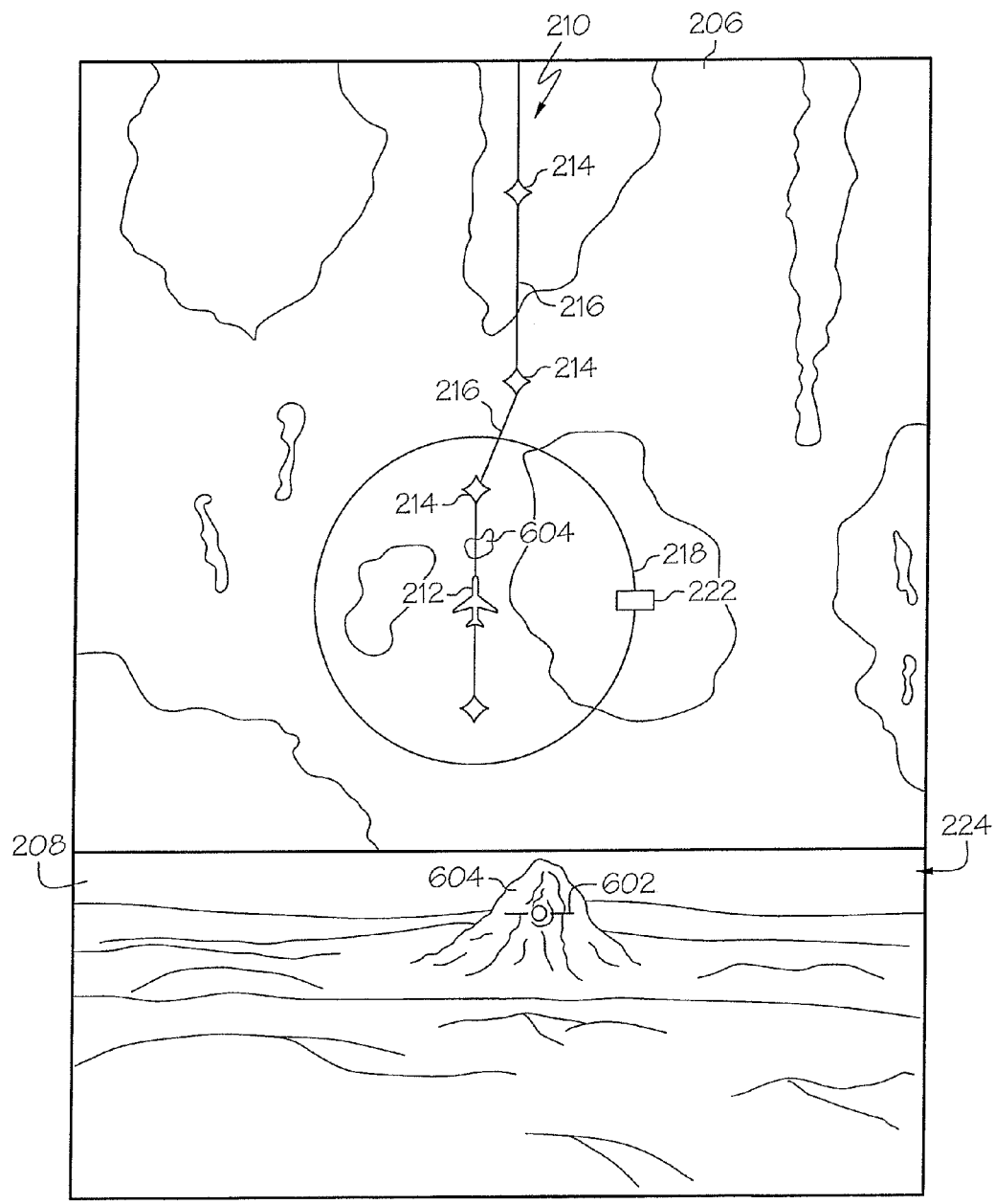

Turning now to FIG. 6, it is seen that the system 100 can also be configured to selectively display a flight path vector 602 in the vertical situation display 208. The flight path vector 602 provides the pilot 109 with an indication of the actual direction in which the aircraft is heading, which allows the pilot 109 to see where the aircraft is headed and if there are any obstacles in the way. For example, in the depicted embodiment, the flight path vector 602 indicates that a hill or mountain 604 presents an obstacle to the present flight path of the aircraft. It will be appreciated that in the depicted embodiment, the perspective vertical situation view 224 in the vertical situation display 208 is centered about the flight path vector 602, though it will be appreciated that this view 224 could be centered about the pitch of the aircraft, or any one of numerous other points of reference. It will additionally be appreciated that the system 100 could be configured to allow a user to selectively center the perspective vertical situation display 224 in the vertical situation display 208 about a desired reference.

Figure 7:
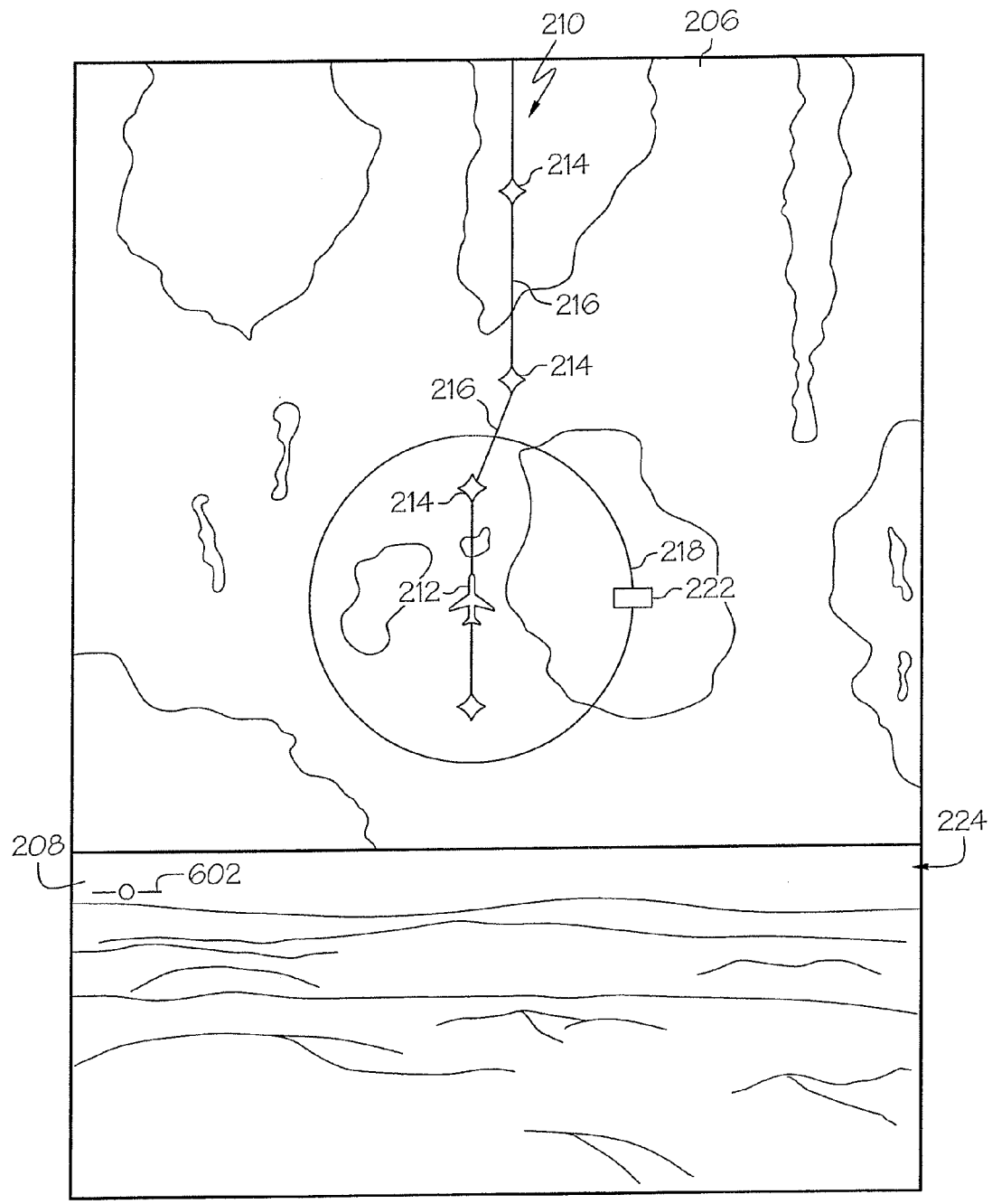
Figure 8:
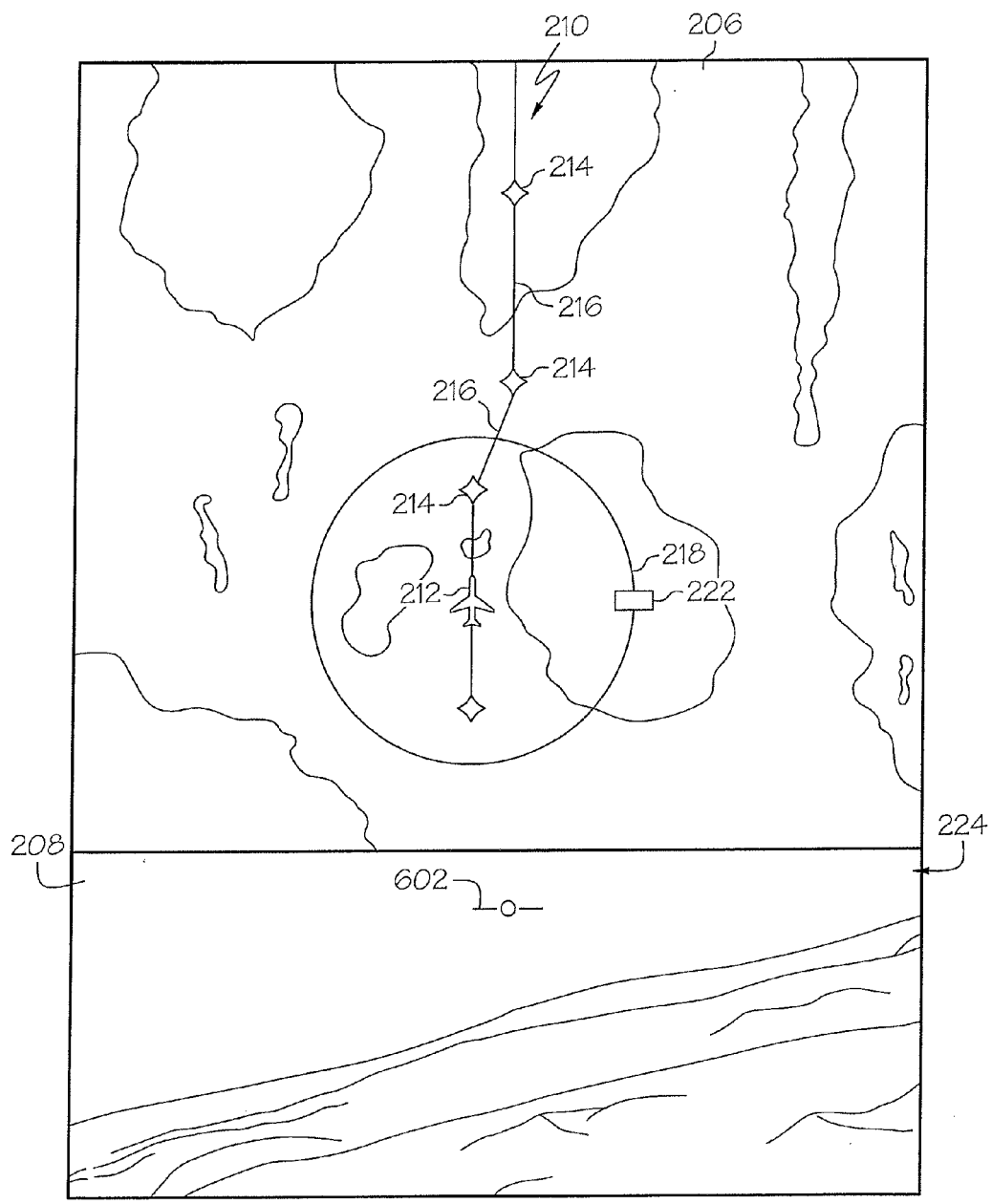

As a further enhancement to displaying the flight path vector 602, the system 100 is also preferably configured to maximize the perspective vertical situation view 224 in the vertical situation display 208 during aircraft maneuvers. In particular, if the aircraft undergoes a turn, a pitch, or a roll, or any one of numerous combinations of these maneuvers, the flight path vector 602 is centered to the opposite side of the direction of the maneuver. For example, and with reference to FIG. 7, if the aircraft is making a right turn maneuver, the flight path vector 602 is displayed on the left side of the vertical situation display 208, and the perspective vertical situation view 224 is centered about the flight path vector 602 at this position. Thus, the pilot 109 is provided with the maximum view in the direction of the turn, which gives the pilot 109 an opportunity to look for any potential terrain hazards. In addition to, or instead of, moving the flight path vector 602 in the direction opposite a pitch and/or roll maneuver, the system 100 can be configured to display the perspective vertical situation view 224 relative to the direction of the ground track. An example of the perspective vertical situation view 224 rendered in the vertical situation display 208 during a climbing right turn is shown in FIG. 8. It will be appreciated that such a display enhances the situational awareness of the pilot 109 during such maneuvers, most notably during dark or low visibility conditions.

Figure 9:
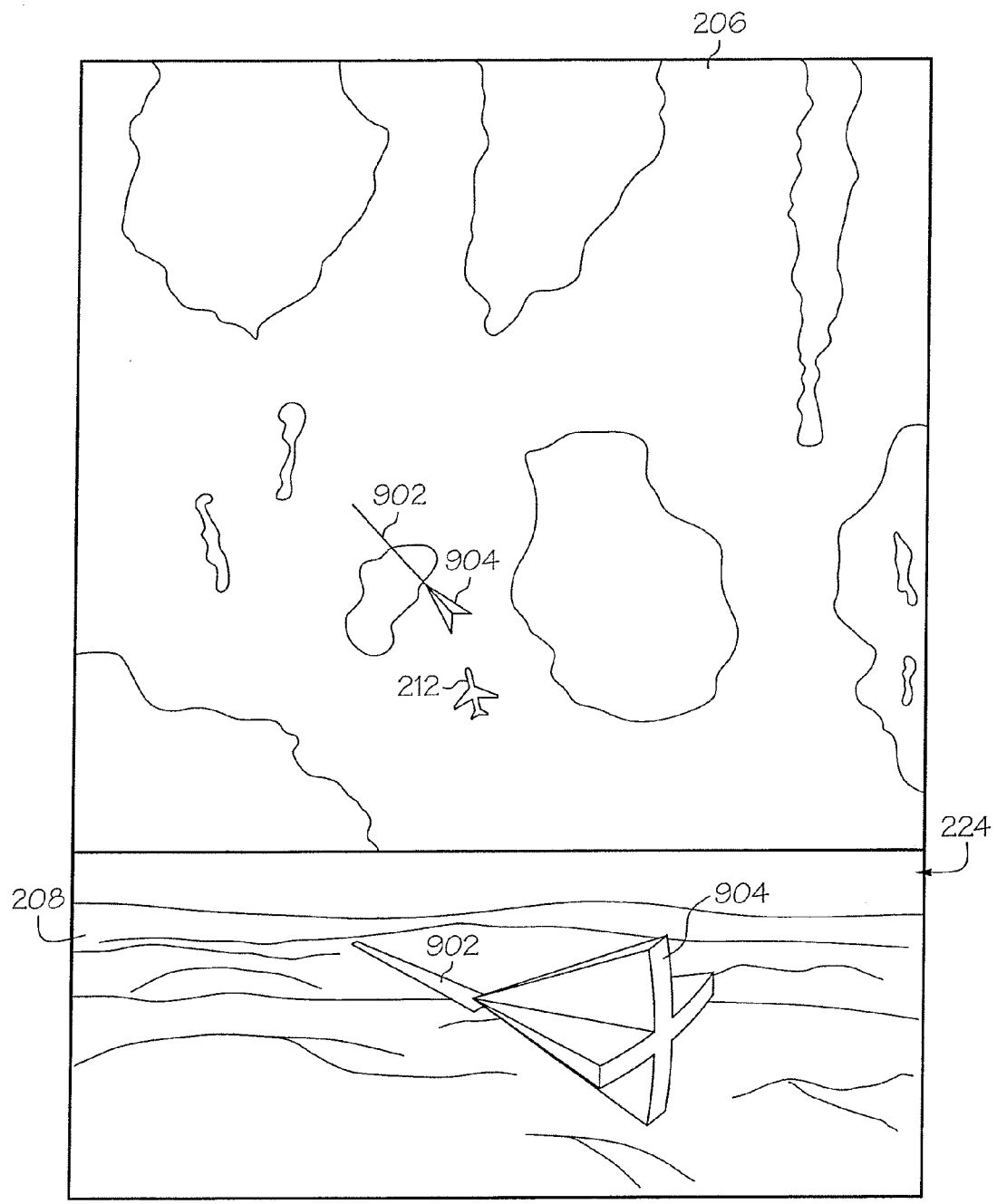

In addition to providing a perspective view of the terrain 220, the system 100 is also preferably configured to provide a perspective view of airport runways, and/or the ILS (integrated landing system) feather associated with each runway, in the vertical situation display 208. An example of a display area 202 that depicts a lateral view and a perspective view of a runway 902 and its associated ILS feather 904 in the lateral situation display 206 and in the vertical situation display 208, respectively, is illustrated in FIG. 9. As FIG. 9 shows, such views provide enhanced situational awareness on the location of the runway 902, the ILS feather 904, and the flight plan 210 and/or flight path, relative to the runway 902.

When an aircraft is on the ground, it may not be preferable to center the perspective vertical situation view 224 in the vertical situation display 208 about the flight path vector 602. Rather, in order to provide the pilot with enhanced situational awareness around the aircraft, the system 100 is preferably configured to elevate the perspective vertical situation view 224 so that it is centered about a fixed point located above the aircraft and with a negative pitch to enable visibility of airport surface features such as, for example, runways, taxiways, and surrounding terrain features. It will be appreciated that the system 100 may be configured to display this elevated view automatically upon landing of the aircraft, via, for example, an input from a weight-on-wheels (WOW) sensor (not illustrated), or to selectively display this view in response to an input from the pilot 109, or a combination of both. As was previously noted, some aircraft are also equipped with the runway awareness and advisory system (RAAS) 126. In such aircraft, the system 100 is also preferably configured to provide visual indications in the vertical situation display 208 that correspond to each of the aural advisories supplied by the RAAS 126.

Figure 10:
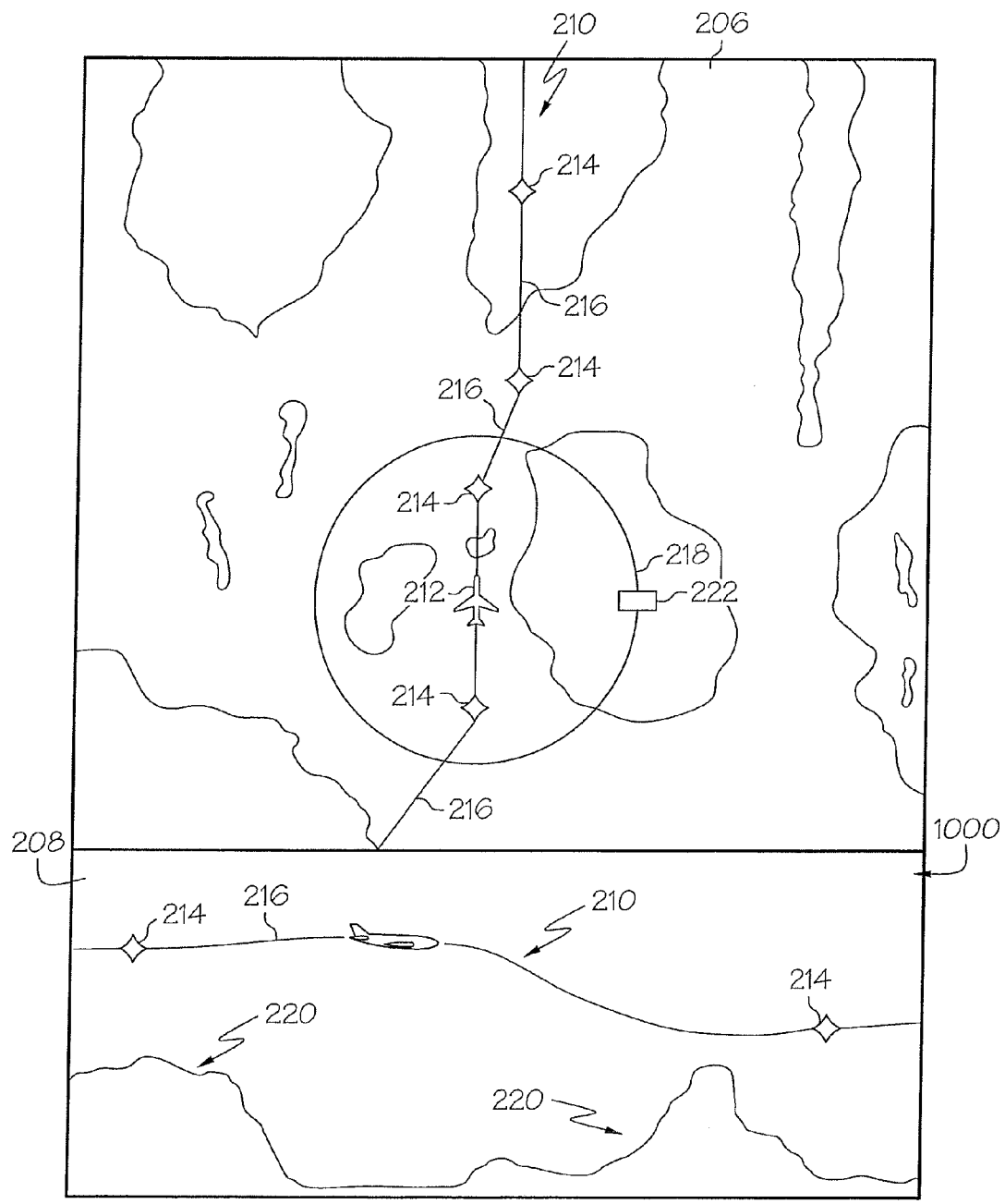
Figure 11:
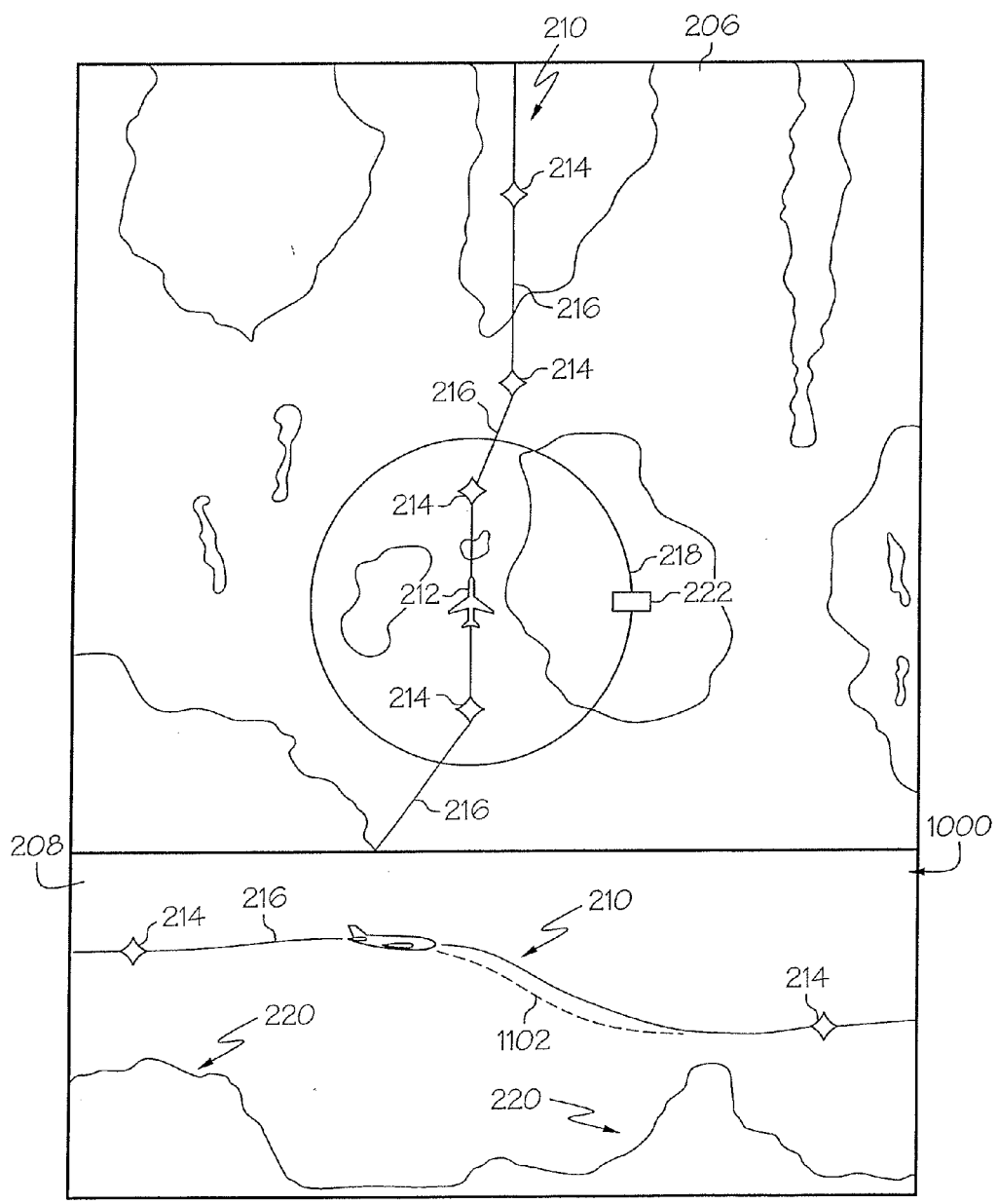

It will be appreciated that the perspective vertical situation view 224 enhances tactical vertical navigation and improves a pilot's awareness of, and ability to avoid, terrain 220. However, it may not provide optimal strategic "downstream" flight planning and/or path intercept capabilities. Conversely, a profile vertical situation view, which is shown more clearly in FIG. 10, does provide such flight planning and path intercept capabilities. The profile vertical situation view 1000, as the name connotes, provides a profile or side-view of the aircraft flight plan, and includes one or more of the waypoint symbols 214 and interconnecting line segments 216, as well as a two-dimensional profile view of the terrain 220. Thus, in a particular preferred embodiment, the system 100 is configured to selectively switch the vertical situation display 208 between the perspective vertical situation view 224 and the profile vertical situation view 1000. It will be appreciated that the system 100 could be configured to switch between the perspective 224 and profile 1000 vertical situation views manually, automatically, in response to some type of user input, or both. For example, the system 100 could be configured to automatically switch from the perspective vertical situation view 224 to the profile vertical situation view 1000 upon entering a path command. An exemplary profile vertical situation view 1000 that may be displayed in the vertical situation display 208 following entry of a descent path into the flight director 122 is shown in FIG. 11. The displayed profile view 1000 includes the flight plan 210, the path command 1102, and a two-dimensional view of the terrain 220. When the aircraft intercepts the flight plan 210, the system 100 then automatically switches back to the perspective vertical situation view 224 to provide the pilot 109 with an enhanced view of any terrain hazards that may exist along the present flight path.

Figure 12:
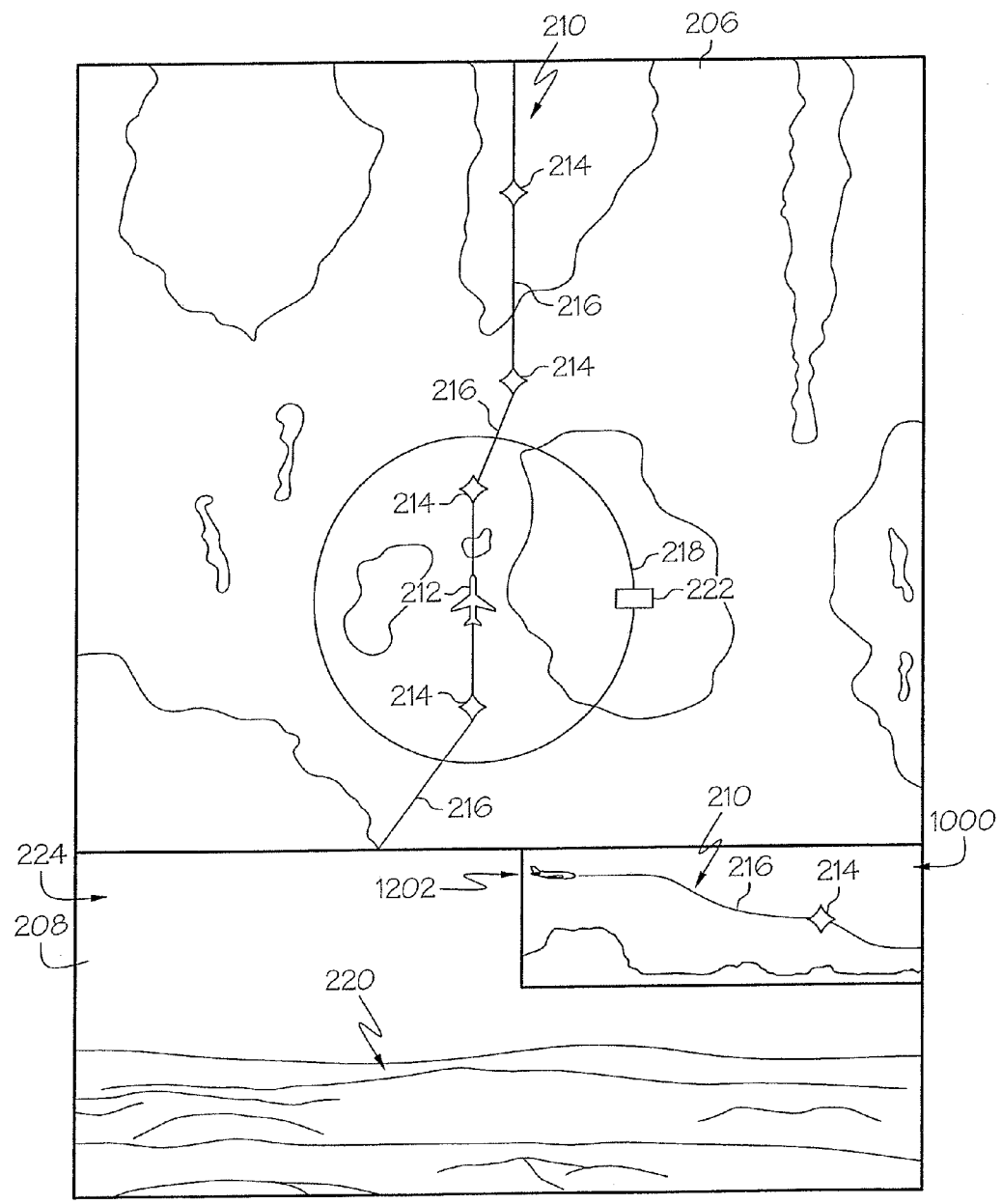
Figure 13:
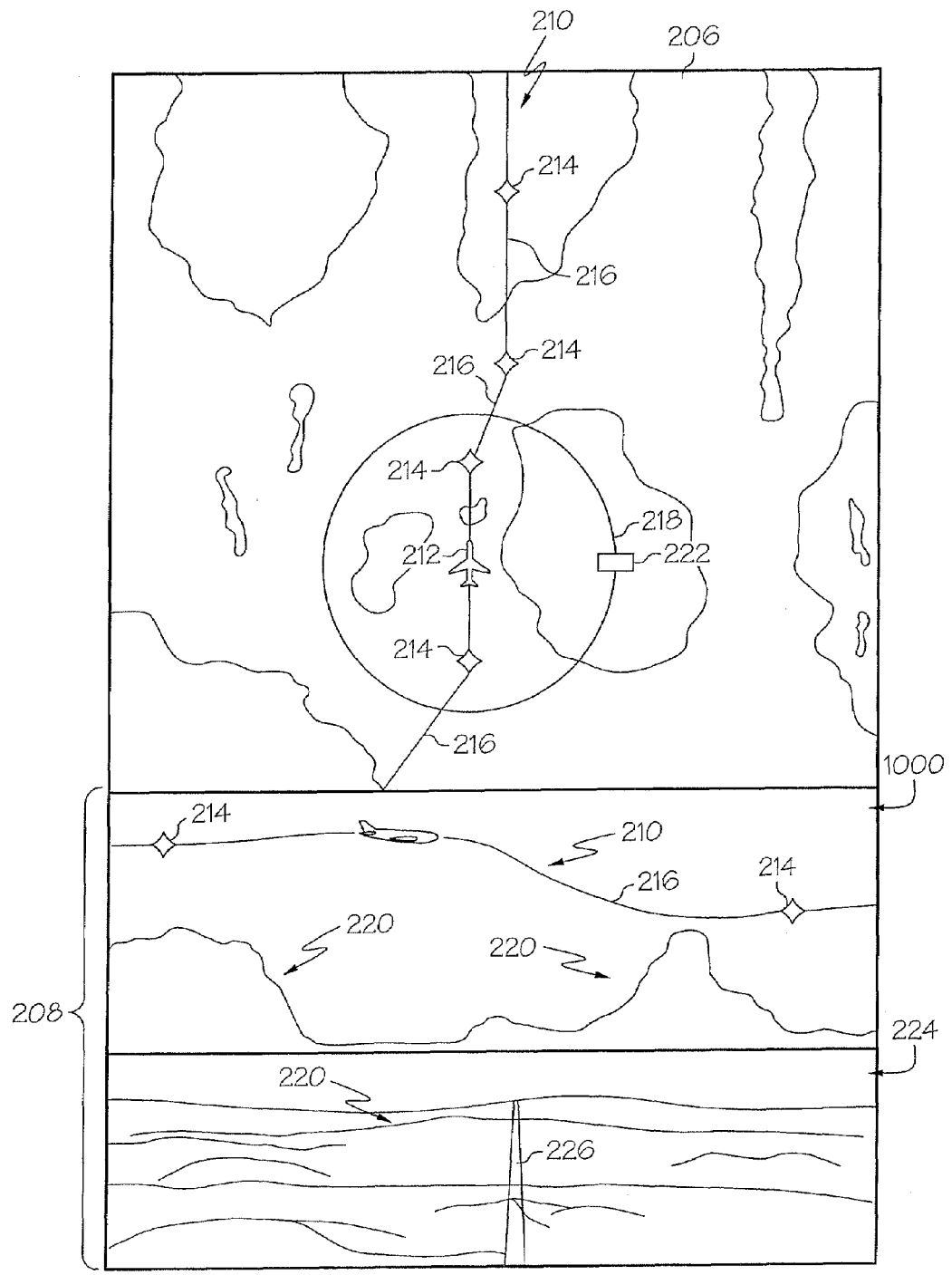

Rather than switching, either automatically or manually, between the perspective 224 and profile 1000 vertical situation views in the vertical situation display 208, it will be appreciated that the system 100 could additionally be configured to simultaneously display both of these views in the display area 202. This could be implemented in any one of numerous ways. For example, FIG. 12 depicts an embodiment in which the system 100 is configured to provide a so-called "picture-in-picture" display of the perspective 224 and profile 1100 vertical situation views. In the depicted embodiment, the profile vertical situation view 1000 is displayed in a small display area 1202 within the vertical situation display 208, and a full-size image of the perspective vertical situation view 224 is displayed in the vertical situation display 208. It will be appreciated that the system 100 could be configured to switch the two views 224, 1100, so that the perspective vertical situation view 224 is displayed in the small display area 1202 and the profile vertical situation view 1000 is displayed in full-size in the vertical situation display 208. In yet another embodiment, which is shown in FIG. 13, the system 100 is configured to simultaneously display full-size images of both the perspective 224 and profile 1000 vertical situation views. In such an embodiment, no switching between display of the perspective 224 and profile 1000 vertical situation views is needed.

Figure 14:
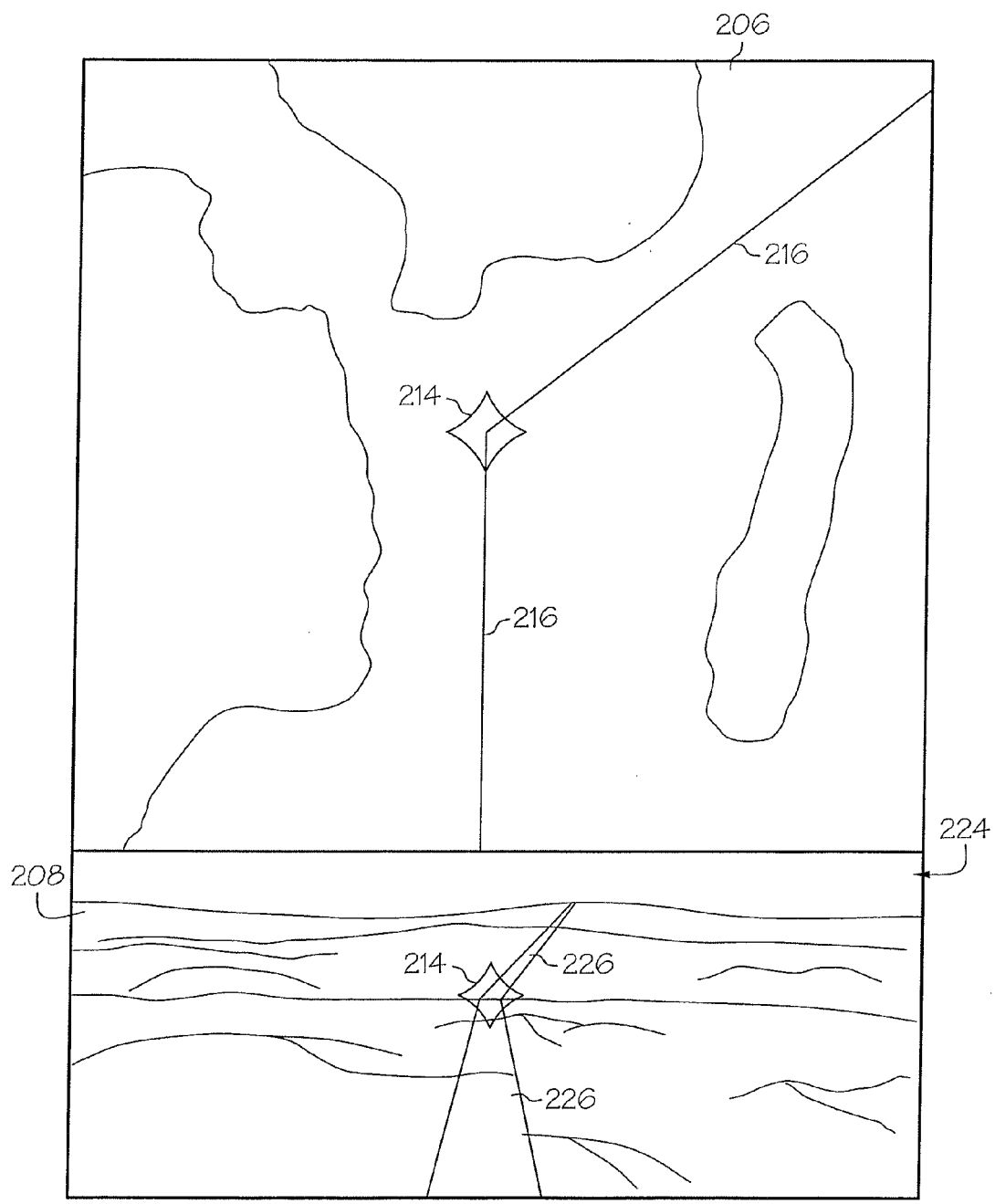

Yet another way to improve the strategic capabilities of the perspective vertical situation view 224 is shown in FIG. 14. In the embodiment shown in FIG. 14, the system 100 is configured to link the lateral view and the perspective vertical situation view 224 so that if a user 109 performs a waypoint center action on the lateral display 206, the vertical situation display 208 will jump to the waypoint 214 and display the perspective vertical situation view 224 at that waypoint 214. The system 100 could additionally be configured to provide the user 109 with the ability to see a perspective vertical situation view 224 of the terrain 220 in a manner similar to a hover mode on a helicopter. Specifically, the centered waypoint 214 is shown and the system 100 allows the user 109 to see a perspective view of the terrain 220 all around the waypoint 214. This capability could improve pilot performance during approaches, since the pilot 109 could view the final approach course and look at any terrain hazards that may exist. In a further enhancement of this capability, the display system 100 is configured to selectively "fly" the displayed flight plan, which allows the pilot 109 to view the approach prior to actually reaching a the final approach course. This enhanced capability allows the pilot 109 to see the terrain and any other potential hazards prior to actually flying the approach.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A flight deck display system for an aircraft, comprising:
a processor adapted to receive terrain data and flight plan data, the processor configured, in response to the terrain data and the flight plan data, to supply one or more image rendering display commands; and
a display device coupled to receive the image rendering display commands and operable, in response thereto, to simultaneously render (i) a two-dimensional lateral situation view image representative of the terrain data, (ii) a perspective vertical situation view image representative of the terrain data, and (iii) flight plan indicia representative of the flight plan data, at least a portion of the flight plan indicia being rendered on the perspective vertical situation view image as a number of spaced-apart geometric shapes,
wherein:
the flight plan data includes data representative of aircraft flight phase, and
the number of geometric shapes that are rendered on the perspective vertical situation view image varies based on the aircraft flight phase.

2. The system of claim 1, wherein each rendered geometric shape is rendered with a size based at least in part on predetermined navigational performance requirements.

3. The system of claim 2, wherein:
each rendered geometric shape has a width and a height;
the width of each rendered geometric shape is based at least in part on required navigational performance data; and
the height of each rendered geometric shape is based at least in part on operational airspace maximum allowed vertical error.

4. A method of displaying terrain on an aircraft flight deck display system, the method comprising the steps of:
processing terrain data and flight plan data; and
simultaneously displaying (i) a two-dimensional lateral situation view image representative of the processed terrain data, (ii) a three-dimensional perspective vertical situation view image representative of the processed terrain data, and (iii) flight plan indicia representative of the processed flight plan data on the perspective vertical situation view image, the flight plan indicia being displayed as a number of spaced-apart geometric shapes, wherein:
the flight plan data includes data representative of aircraft flight phase, and
the number of geometric shapes that are rendered on the perspective vertical situation view image is varied based on the aircraft flight phase.

5. The method of claim 4, further comprising:
displaying each geometric shape with a size that is based at least in part on predetermined navigational performance requirements.

6. The method of claim 5, wherein each rendered geometric shape has a width and a height, and wherein the method further comprises:
displaying each geometric shape with a width that is based at least in part on required navigational performance data; and
displaying each geometric shape with a height that is based at least in part on operational airspace maximum allowed vertical error.

* * * * *